(12) United States Patent
Lu et al.

(10) Patent No.: US 9,527,998 B2
(45) Date of Patent: Dec. 27, 2016

(54) THERMOPLASTIC POLYURETHANE COMPOSITION WITH HIGH INSULATION RESISTANCE

(75) Inventors: Lan Lu, Shanghai (CN); Given Jing Chen, Shanghai (CN); Xiaowei Wilson Yan, Shanghai (CN); Bin Li, Shanghai (CN); Weiming Wayne Ma, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 661 days.

(21) Appl. No.: 13/503,229

(22) PCT Filed: Oct. 28, 2009

(86) PCT No.: PCT/CN2009/074653
§ 371 (c)(1),
(2), (4) Date: Apr. 20, 2012

(87) PCT Pub. No.: WO2011/050520
PCT Pub. Date: May 5, 2011

(65) Prior Publication Data
US 2012/0202061 A1 Aug. 9, 2012

(51) Int. Cl.
*C08K 5/521* (2006.01)
*H01B 3/30* (2006.01)
*C08L 63/04* (2006.01)
*C08L 75/08* (2006.01)
*H01B 7/295* (2006.01)
*C08K 3/00* (2006.01)
*C08K 3/22* (2006.01)
*C08K 5/00* (2006.01)
*C08K 5/523* (2006.01)

(52) U.S. Cl.
CPC .............. *C08L 75/08* (2013.01); *H01B 7/295* (2013.01); *C08K 3/0058* (2013.01); *C08K 3/22* (2013.01); *C08K 5/0066* (2013.01); *C08K 5/523* (2013.01); *C08L 63/04* (2013.01); *Y10T 428/294* (2015.01)

(58) Field of Classification Search
CPC .............. C08L 75/04; C08K 3/32; C08K 5/49
USPC ......................................................... 428/379
See application file for complete search history.

(56) References Cited

U.S. PATENT DOCUMENTS

| | | | |
|---|---|---|---|
| 3,810,850 A | 5/1974 | Rowton | |
| 4,542,170 A | 9/1985 | Hall et al. | |
| 4,599,365 A | 7/1986 | Gagliani et al. | |
| 4,690,964 A * | 9/1987 | Schmidt et al. | ............... 524/125 |
| 5,153,245 A | 10/1992 | Cipolli et al. | |
| 6,404,971 B2 | 6/2002 | Mehl | |
| 6,696,530 B2 * | 2/2004 | Mehl | .............. 525/453 |
| 7,449,577 B2 | 11/2008 | Kimura et al. | |
| 7,465,761 B2 | 12/2008 | Murase et al. | |
| 2002/0072554 A1 | 6/2002 | Mehl | |
| 2003/0013792 A1 | 1/2003 | Muhlfeld et al. | |
| 2007/0261878 A1 | 11/2007 | Kosaka et al. | |
| 2008/0090075 A1 | 4/2008 | Kondo et al. | |
| 2011/0130490 A1* | 6/2011 | Brown et al. | .................. 524/100 |

FOREIGN PATENT DOCUMENTS

| | | |
|---|---|---|
| CN | 101108914 | 1/2008 |
| CN | 101225224 | 7/2008 |
| CN | 101570632 | 11/2009 |
| DE | EP1491580 A1 * | 12/2004 |
| EP | 0062210 A2 | 10/1982 |
| EP | 0845492 A1 | 6/1998 |
| EP | 1213325 A1 | 6/2002 |
| EP | 1491580 B1 | 9/2007 |
| GB | 1395780 | 5/1975 |
| JP | 4368712 | 12/1992 |
| JP | 2002060596 | 2/2002 |
| JP | 2002146179 | 5/2002 |
| JP | 2002146179 A * | 5/2002 |
| JP | 2004091679 | 3/2004 |
| JP | 2005054040 | 3/2005 |
| JP | 2008117609 | 5/2008 |
| WO | 9220731 A1 | 11/1992 |
| WO | 2006092974 A1 | 9/2006 |
| WO | 2008011941 A1 | 1/2008 |
| WO | 2008120854 | 10/2008 |
| WO | 2008151894 A1 | 12/2008 |
| WO | 2009047353 A1 | 4/2009 |
| WO | 2010012126 A1 | 2/2010 |
| WO | 2010012136 A1 | 2/2010 |
| WO | 2011/011921 A1 | 2/2011 |

OTHER PUBLICATIONS

Machine Translation of JP 2002 146179 A; 2002.*
Machine Translation EP 1491580 A1, Dec. 2004.*
Ying Ling Liu Flame retardant epoxy resins from novel phosphorus-containing novolac, 2001.*

* cited by examiner

Primary Examiner — Jennifer Chriss
Assistant Examiner — Ricardo Lopez
(74) Attorney, Agent, or Firm — Husch Blackwell LLP

(57) ABSTRACT

Flame retardant compositions that include a thermoplastic polyurethane, a metal hydrate flame retardant and a phosphorus-based flame retardant are provided. The compositions are characterized by good flame retardant properties, as well as high insulation resistance.

6 Claims, No Drawings

THERMOPLASTIC POLYURETHANE COMPOSITION WITH HIGH INSULATION RESISTANCE

FIELD

This invention relates to flame retardant thermoplastic compositions having high insulation resistance (IR), and further relates to articles made from the thermoplastic compositions and methods for making the thermoplastic compositions.

BRIEF SUMMARY

One aspect of the invention provides compositions comprising a thermoplastic polyurethane, a metal hydrate flame retardant and a phosphorus based flame retardant having insulation resistance properties. The compositions are characterized in that they passes the UL 94 flame retardant standard and have an insulation resistance of at least 3 GΩ.m as measured by UL 62. In some embodiments, the compositions have an insulation resistance of at least 3.5 GΩ.m as measured by UL 62. The phosphorus based flame retardant having insulation resistance properties can be bisphenol A bis(diphenyl phosphate). The metal hydrate flame retardant can be an aluminum hydroxide.

The present can further comprise a char-forming agent, such as an epoxy novolac.

In some embodiments, the compositions comprise at least 30 weight percent metal hydrate flame retardant, based on the total weight of the composition and at least 5 weight percent bisphenol A bis(diphenyl phosphate), based on the total weight of the composition. This includes compositions that comprise 30 to 40 weight percent metal hydrate flame retardant, based on the total weight of the composition and 10 to 20 weight percent bisphenol A bis(diphenyl phosphate), based on the total weight of the composition.

Another embodiment of the invention provides an insulated electrically conductive wire at least partially coated with one of the present compositions.

DETAILED DESCRIPTION

One aspect of the invention provides flame retardant compositions that include a thermoplastic polyurethane, a metal hydrate flame retardant and a phosphorus-based flame retardant. The compositions are characterized by good flame retardant properties, as well as high insulation resistance. As such, the present compositions are distinguishable from other flame retardant compositions that include organic flame retardants that do not impart said compositions with insulation resistance. The compositions may be further characterized by mechanical properties, heat deformation properties and/or chemical resistance properties that render them well-suited for a variety of applications, including wire and cable insulation and jacketing. Due to their superior IR properties, the present compositions are particularly suited for use in AC power cable insulation.

"Composition", "formulation" and like terms means a mixture or blend of two or more components. In the context of a mix or blend of materials from which a cable sheath or other article of manufacture is fabricated, the composition includes all the components of the mix, e.g., thermoplastic polyurethane, metal hydrate, flame retardant and any other additives.

Thermoplastic Polyurethanes

A "thermoplastic polyurethane" (or "TPU"), as used herein, is the reaction product of a di-isocyanate, one or more polymeric diol(s), and optionally one or more difunctional chain extender(s). The TPU may be prepared by the prepolymer, quasi-prepolymer, or one-shot methods. The di-isocyanate forms a hard segment in the TPU and may be an aromatic, an aliphatic, or a cycloaliphatic di-isocyanate or a combination of two or more of these compounds.

A nonlimiting example of a structural unit derived from di-isocyanate (OCN—R—NCO) is represented by formula (I) below:

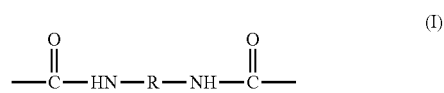

in which R is an alkylene, cycloalkylene, or arylene group. Representative examples of these di-isocyanates can be found in U.S. Pat. Nos. 4,385,133, 4,522,975 and 5,167,899.

Nonlimiting examples of suitable di-isocyanates include 4,4'-di-isocyanatodiphenyl-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding a "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extenders can be aliphatic straight or branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above.

As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

Nonlimiting examples of suitable TPUs include the PELLETHANE™ thermoplastic polyurethane elastomers available from the Lubrizol Corporation; ESTANE™ Tm thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ Tm thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers.

The thermoplastic polyurethane component of the compositions may contain a combination of two or more TPUs as described above.

The TPUs are typically used in amounts ranging from 15 to 60 wt % based on the total weight of the composition. This includes embodiments in which TPUs are used in amounts ranging from 20 to 40 wt % based on the weight of the composition and further includes embodiments in which the TPUs are used in amounts ranging from 25 to 35 wt % based on the total weight of the composition.

Metal Hydrate Flame Retardants

The metal hydrates in the present compositions impart flame retardant properties to the compositions. Suitable examples include, but are not limited to, aluminum trihydroxide (also known as ATH or aluminum trihydrate) and magnesium hydroxide (also known as magnesium dihydroxide). The metal hydroxide may be naturally occurring or synthetic.

The metal hydrates are typically used in amounts of at least 20 wt % based on the total weight of the composition. This includes embodiments in which metal hydrates are used in amounts of at least 30 wt % based on the total weight of the composition and further includes embodiments in which the metal hydrates are used in amounts of at least 40 wt % based on the total weight of the composition.

Phosphorus Based Flame Retardants Having IR Properties

The phosphorus-based flame retardants having IR properties are capable of imparting the compositions with enhanced IR properties, including wet IR properties. Importantly, this is not an inherent or common property of all phosphorus-based flame retardants, as illustrated by the examples, below. Bisphenol A bis(diphenyl phosphate)(B-PADP) is an example of a phosphorus-based flame retardant that imparts IR properties to the present compositions.

The phosphorus-based flame retardants having IR properties are typically used in amounts of at least 5 wt % based on the total weight of the composition. This includes embodiments in which the phosphorus-based flame retardants having IR properties are used in amounts of at least 10 wt % based on the total weight of the composition and further includes embodiments in which the phosphorus-based flame retardants having IR properties are used in amounts of at least 15 wt % based on the total weight of the composition. For example, in some embodiments, the phosphorus-based flame retardants having IR properties are used in amounts of 10 to 15 wt % based on the total weight of the composition.

Other Flame Retardants

In addition to the metal hydrates and the at least one phosphorous-based flame retardant having IR properties, additional flame retardants can optionally be included in the compositions. Additional phosphorus-based flame retardants that can be included in the compositions include, but are not limited to, organic phosphonic acids, phosphonates, phosphinates, phosphonites, phosphinites, phosphine oxides, phosphines, phosphites or phosphates, phosphorus ester amides, phosphoric acid amides, phosphonic acid amides, and phosphinic acid amides. The flame retardants present in the compositions are desirably halogen-free, such that a halogen-free composition can be provided. "Halogen-free" and like terms mean that the compositions are without or substantially without halogen content, i.e., contain less than 2000 mg/kg of halogen as measured by ion chromatography (IC) or a similar analytical method. Halogen content of less than this amount is considered inconsequential to the efficacy of the composition as, for example, a wire or cable covering.

Char Forming Agents

The present compositions can optionally include one or more char forming agents to prevent or minimize dripping during combustion. For example, some embodiments of the compositions include an epoxidized novolac resin as a char forming agent. An "epoxidized novolac resin," is the reaction product of epichlorohydrin and phenol novolac polymer in an organic solvent. Nonlimiting examples of suitable organic solvents include acetone, methyl ethyl ketone, methyl amyl ketone, and xylene. The epoxidized novolac resin may be a liquid, a semi-solid, a solid, and combinations thereof The epoxidized novolac resins are typically used in amounts ranging from 0.1 to 5 wt % based on the total weight of the composition. This includes embodiments in which the epoxidized novolac resins are used in amounts ranging from 1 to 3 wt % based on the total weight of the composition and further includes embodiments in which the epoxidized novolac resins are used in amounts ranging from 1.5 to 2 wt % based on the total weight of the composition.

Additives and Fillers

The compositions can, optionally, also contain additives and/or fillers. Representative additives include, but are not limited to, antioxidants, melt processing thermal stabilizers, hydrolytic stability enhancers, processing aids, colorants, coupling agents, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. These additives are typically used in a conventional manner and in conventional amounts, e.g., from 0.01 wt % or less to 10 wt % or more based on the weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; clay such as diatomite, kaolin and montmorillonite; huntite; celite; asbestos; ground minerals; and lithopone. These fillers are typically used in a conventional manner and in conventional amounts, e.g., from 5 wt % or less to 50 wt % or more based on the weight of the composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2, 2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinypester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6, - tetramethyl-1-piperidineethanol and 90 wt % of N,N'''-[1,2-Ethanediylbis [[[4,6-b is [butyl (1,2,2,6,6-pentamethyl-4-piperidinyl)amino]-1,3,5-traizin-2-yl]imino]-3,1-propanediyl]] bis [N'N''-dibutyl-N'N''-bis (1,2,2,6,6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

Examples of antioxidants include, but are not limited to, hindered phenols such as tetrakis [methyl ene(3,5-di-tert-butyl-4-hydroxyhydro-cinnamate)]methane; bis [(beta-(3,5 -ditert-butyl-4-hydroxybenzyl)-methylcarboxyethyl)]sulphide, 4,4'-thiobis(2-methyl-6-tert-butylphenol), 4,4'-thiobis (2-tert-butyl-5-methylphenol), 2,2'-thiobis(4-methyl-6-tert-butylphenol), and thiodiethylene bis (3,5 -di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; varioussiloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers. Antioxidants can be used, for example, in amounts of 0.1 to 5 wt % based on the weight of the composition.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Insulation Resistance

As noted above, the present compositions are characterized by enhanced insulation resistance. For the purposes of this disclosure, IR and wet IR are measured in accordance with the UL 62 standard, as described in greater detail in the examples, below. In some embodiments, the compositions have an IR of at least 3 GΩ.m. This includes compositions having an IR of at least 3.5 GΩ.m and further includes compositions having an IR of at least 3.9 GΩ.m. In some embodiments, the compositions have a wet IR of at least 2.5 GΩ.m. This includes embodiments in which the compositions have a wet IR of at least 3 GΩ. m.

Flame Retardance

In addition to their superior insulation resistant properties, the present compositions exhibit good flame retardant properties. Thus, some embodiments of the compositions are characterized in that they are VW-1 classified. "VW-1" is an Underwriters' Laboratory (UL) flame rating for wire and sleeving. It denotes "Vertical Wire, Class 1", which is the highest flame rating a wire or sleeve can be given under the UL 1441 specification. The test is performed by placing the wire or sleeve in a vertical position. A flame is set underneath it for a period of time, and then removed. The characteristics of the sleeve are then noted. The VW-1 flame test is determined in accordance with Method 1080 of UL-1581.

Mechanical Properties

The present compositions can exhibit good heat deformation properties, as measured in accordance with UL 1581-2001 and described in greater detail in the examples below. In some embodiments, the compositions have a 150° C. deformation of no greater than 30%. This includes compositions having a 150° C. deformation of no greater than 25%.

The present thermoplastic polymer compositions can be further characterized by their tensile strength at break (in MPa) and elongation at break (%). Tensile strength and elongation can be measured in accordance with the ASTM D-638 testing procedure using type I tensile bar 165×12.7× 3.18 mm samples. Elongation at break, or elongation to break, is the strain on a sample when it breaks. It usually is expressed as a percent. The examples below illustrate tensile strength measurements conducted on heat-aged (per UL 1581) and non-heat-aged compositions.

Some embodiments of the unaged compositions have tensile strengths at break of at least 13 MPa, while some embodiments of the aged compositions have a tensile strength at break of at least 18 MPa. Some embodiments of the unaged compositions have an elongation at break at least 260%, while some embodiments of the aged compositions have an elongation at break of at least 220%.

Compounding

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as a Farrel™ continuous mixer, a Werner and Pfleiderer™ twin screw mixer, or a Buss™ kneading continuous extruder.

Articles

Another aspect of the invention provides articles, such as molded or extruded articles, comprising one or more compositions of present invention.

Articles include cable jackets and wire insulation. Thus, in some embodiments, the article includes a metal conductor and a coating on this metal conductor to provide an "insulated" wire capable of electrical transmission of low voltage telecommunication signals or for a wide range of electrical power transmission applications. A "metal conductor," as used herein, is at least one metal component used to transmit either electrical power and/or electrical signals. Flexibility of wire and cables is often desired, so the metal conductor can have either a solid cross-section or preferentially can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to cable "jacketing". For some cables, the sheathing is only a polymeric jacketing layer surrounding a cable core. There are also some cables having a single layer of polymer surrounding the conductors, performing both the roles of insulation and jacketing. The present compositions may be used as, or in, the polymeric components in a full range of wire and cable products, including AC power cables and both metallic and fiber optic communication applications. Use includes both direct contact and indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening material(s) is located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

Nonlimiting examples of suitable coated metal conductors include wiring for consumer electronics, a power cable, a power charger wire for cell phones and/or computers, computer data cords, power cords, appliance wiring material, and consumer electronic accessory cords.

A cable containing an insulation layer comprising a composition of this invention can be prepared with various types of extruders, e.g., single or twin screw types. The compositions may have extrusion capability on any equipment suitable for thermoplastic polymer extrusion.

The most common fabrication equipment for wire and cable products is a single screw plasticating extruder. A description of a conventional single screw extruder can be found in U.S. Pat. No. 4,857,600. An example of co-extrusion and an extruder therefore can be found in U.S. Pat. No. 5,575,965.

The following examples illustrate various embodiments of this invention. All parts and percentages are by weight unless otherwise indicated.

SPECIFIC EMBODIMENTS

The following examples illustrate embodiments of methods for making thermoplastic polymer compositions in accordance with the present invention.

Materials:

The TPU used in these examples is PELLETHANE™ 2103-90 AE, a polyether thermoplastic polyurethane (available from Lubrizol Advanced Materials). Before using, the TPU samples are pre-dried at 90° C. for at least 4 hrs under vacuum. Bisphenol A bis(diphenyl phosphate) (BPADP) obtained from Adeka with grade name FP600 is used as received. Aluminum hydrate obtained from Showa Denka is pre-dried at 100 ° C. for 6 hrs.

The epoxidized novolac char-forming agent is solvent free DEN438 which has an epoxide equivalent weight (EEW) of 176-181 (available from Dow Chemical). It is used as a char forming agent to prevent dripping during combustion. The additives in these embodiments of the compositions are AD-001 anti-dripping agent, Irganox 1010 and Irgafos 168 anti-oxidants, UV 666 and $TiO_2$ UV stabilizers, and Clariant MB color-match additive.

Processing:

The compositions shown in Table A are prepared on a twin screw extruder. Composition preparation is carried out in accordance with the description that follows. The TPU is added to a high speed mixer. A portion of the aluminum oxide trihydrate filler is added and mixed for 10 seconds. Then the remaining aluminum oxide trihydrate is added to the mixture, together with the BPADP. Pre-heated epoxidized novolac is spooned gradually into the mixer.

Next, the Irganox 1010 and Irgafos 168 additives are added. When all the components have been added into the mixer, the resulting mixture is mixed under 1800 RPM for 1 minute. Then the pre-mixed blends are removed from the mixer and extruded by a twin screw extruder having a barrel temperature under 190° C., a screw diameter of 35.5 mm and an L/D (length to diameter ratio) of 38.6, with an output about 20 kg/hr. The resulting pellets are dried at 120° C. for 6 hrs.

Characterization:

The compositions are characterized by their IR, wet IR, heat deformation, tensile properties, heat aging properties and flame resistance according to the following tests and standards.

Insulation Resistance and Wet Insulation Resistance:

The wire sample used for testing insulation resistance is single cord. Single cord wires are made using a Brabender wire-coating unit to coat one layer of the melted composition around a copper conductor. Measurements of IR and wet IR are conducted by a withstand voltage tester (Dongguan Yuehua Electric Industrial Co., Ltd, China), following the UL 62 standard. A single cord with a length of 10 meters (m) is used for the testing. Both ends of the cord are peeled to expose the copper wire. For the IR tests, 500 V DC is applied between the conductors and a testing electrode in air and the IR is measured after one minute. For the wet IR tests, the cord is immersed in clear water grounded previously for at least 1 h. The 500 V DC voltage is applied between the conductors and a high voltage electrode in water, and the wet IR values are measured after one minute while still immersed.

Heat Deformation:

Heat deformation testing is conducted according to the UL 1581-2001 standard. For each formulation, two parallel sample plaques are placed into an oven and preheated at 150° C. for one hour. The preheated samples are then pressed with the same loading at 150 ° C. for one hour. The pressed samples, without removal of weights, are placed in an ASTM room with a setting temperature of 23° C. for an additional hour. The change of the thickness of the sample plaques is recorded and heat deformation (HD) is calculated according to HD %=$(D_0-D_1)/D_0$*100%, wherein $D_0$ represents the original sample thickness and $D_1$ represents the sample thickness after the deformation process. Calculated deformations for the two parallel samples are averaged.

Tensile Testing:

Tensile tests are performed using an Instron tensile machine (Type 5565) according to ASTM D 638 with a speed of 500 mm/min. Plaque samples (ASTM D 638 Type 1 tensile bar 165×12.7×3.18 mm) are prepared by a FANUC 100 ton high speed injection molding machine.

Heat Aging:

The heat aging test is conducted in accordance with UL 1581. The samples are first aged in a full-draft circulating-air oven at 121.0±1.0° C. for 168 hours, and then tested by an Instron machine according to ASTM D 638. The retention is calculated according to retention %=aged/unaged*100%.

Flame Resistance:

Mimic VW-1 FR tests are conducted in a UL 94 chamber. The test specimens are limited to dimensions of 200*2.7*1.9 mm. The specimen are hung on a clamp, with longitudinal axis vertical by applying a 50 g load on the lower end. A paper flag (2*0.5 cm) is attached to the top of the wire. The distance from the flame bottom (highest point of the burner oracle) to the bottom of flag is 18 cm. The flame is applied continuously for 45 seconds. After flame time (AFT), uncharred wire length (UCL) and uncharred flag area percentage (flag uncharred) are recorded during and after combustion. Four or five specimens are tested for each sample. Any of the following phenomenon result in a classification of "not pass": (1) the cotton under the specimen is ignited; (2) the flag is burned out; and/or (3) there is dripping with flame.

Results:

Table A shows the formulation for a comparative example that uses resorcinol diphenyl phosphate (RDP) as an organic flame retardant and a formulation for an inventive example that uses BPADP as a flame retardant. Table 1 also reports the measured properties of both formulations. The first column shows that the comparative example has poor IR performance and heat aging tensile elongation retention. The second column shows that the inventive example provides significantly improved IR, wet IR and heat aging properties, as well as a good balance of burning performance, 150° C. heat deformation and mechanical properties.

TABLE A

| Description | Comparative example (proportions in weight %) | Inventive example (proportions in weight %) |
| --- | --- | --- |
| 2103-90AE | 33 | 34 |
| Showa Denka ATH | 39 | 41 |
| BPADP | / | 14 |
| RDP | 13 | / |
| DEN 438 | 2 | 2 |
| AD-001 | 0.06 | 0.06 |
| Irgafos ™ 168 | 0.09 | 0.09 |
| Irganox ™ 1010 | 0.54 | 0.54 |
| $TiO_2$ | 9 | 9 |
| UV 866 | 1 | / |
| Clariant MB | 2.3 | / |
| Sum | 100.00 | 100.00 |
| Properties | | |
| IR (GΩ · m) | 0.13 | 3.94 |
| Wet IR (GΩ · m) | 0.11 | 3.20 |
| Mimic VW-1 (Pass/Total) | 4/4 | 4/4 |
| 150° C. Heat Deformation | 39% | 24% |
| Tensile Elongation, % (unaged) | 310 | 272 |
| Stdev. | 24 | 10 |
| Tensile Strength, MPa (unaged) | 12.44 | 13.30 |
| Stdev. | 0.27 | 0.39 |
| Tensile Elongation, % (aged, 120° C. 168 hrs) | 222 | 230 |
| Stdev. | 22 | 6 |
| Tensile Strength, MPa (aged, 120° C. 168 hrs) | 15.77 | 18.44 |
| Stdev. | 0.16 | 0.21 |
| Tensile Elongation retention, % | 72% | 85% |
| Tensile Strength. retention, % | 127% | 139% |

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, tensile strength, elongation at break, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of TPU, metal hydrates, flame retardants and additives in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

The term "or", unless stated otherwise, refers to the listed members individually as well as in any combination.

Although the invention has been described in considerable detail through the preceding description, drawings and examples, this detail is for the purpose of illustration. One skilled in the art can make many variations and modifications without departing from the spirit and scope of the invention as described in the appended claims.

The invention claimed is:

1. A composition comprising:
    (a) 20-40 wt % of a thermoplastic polyurethane;
    (b) 30-41 wt % of a metal hydrate flame retardant selected from the group consisting of aluminum hydroxide and magnesium hydroxide; and
    (c) 10-15 wt % of bisphenol A bis(diphenyl phosphate);
    (d) 0.1-5 wt % of a char-forming agent comprising an epoxidized novolac resin;
    the wt % based on the total weight of the composition;
    the composition characterized in that it passes the UL 94 flame retardant standard and has an insulation resistance of at least 3 GΩ.m as measured by UL 62.

2. The composition of claim 1, in which the composition has an insulation resistance of at least 3.5 GΩ.m as measured by UL 62.

3. The composition of claim 1, comprising 30 to 40 wt % metal hydrate flame retardant, based on the total weight of the composition.

4. The composition of claim 1, wherein the metal hydrate flame retardant is an aluminum hydroxide.

5. An insulated electrically conductive wire at least partially coated with the composition of claim 1.

6. An insulated electrically conductive wire at least partially coated with the composition of claim 3.

* * * * *